United States Patent [19]

Rozmanith et al.

[11] Patent Number: 5,253,341
[45] Date of Patent: Oct. 12, 1993

[54] REMOTE QUERY COMMUNICATION SYSTEM

[76] Inventors: Anthony I. Rozmanith, 118 W. Riding Dr.; Neil Berinson, P.O. Box 595, both of, Cherry Hill, N.J. 08003

[21] Appl. No.: 683,972

[22] Filed: Apr. 11, 1991

Related U.S. Application Data

[63] Continuation-in-part of Ser. No. 665,528, Mar. 4, 1991, abandoned.

[51] Int. Cl.$^5$ .............................................. G06F 13/14
[52] U.S. Cl. .................................... 395/200; 395/600; 395/700; 395/934; 358/86
[58] Field of Search ................ 364/DIG. 1, DIG. 2; 358/86; 395/275, 325, 600, 700, 934

[56] References Cited

U.S. PATENT DOCUMENTS

| | | | |
|---|---|---|---|
| 4,386,416 | 5/1983 | Giltner et al. | 395/375 |
| 4,648,036 | 3/1987 | Gallant | 364/300 |
| 4,648,037 | 3/1987 | Valentino | 364/408 |
| 4,723,211 | 2/1988 | Barker et al. | 364/300 |
| 4,739,477 | 4/1988 | Barker et al. | 364/300 |
| 4,760,390 | 7/1988 | Maine et al. | 273/1 |
| 4,764,867 | 8/1988 | Hess | 364/200 |
| 4,769,762 | 9/1988 | Tsujido | 364/521 |
| 4,777,485 | 10/1988 | Costello | 340/799 |
| 4,779,080 | 10/1988 | Coughlin et al. | 340/712 |
| 4,949,248 | 8/1990 | Caro | 364/200 |
| 5,132,992 | 7/1992 | Yurt et al. | 358/86 X |

*Primary Examiner*—Robert L. Richardson
*Attorney, Agent, or Firm*—Synnestvedt & Lechner

[57] ABSTRACT

An improved method and apparatus for downloading compressed audio/visual (AV) data and/or graphical/tabular information from a remote Server to an End User Station (EUS) for the purpose of decompressing and/or displaying said downloaded data. The EUS may transmit a query to the Server manually and/or automatically for the purpose of initiating a process in the Server (e.g. data compression, indexing into a very large database, etc.), which requires the high speed processing, large capacity and multi-distributed data storage, etc.) which are typically preferred at a Server. The EUS provides appropriate inverse processing (e.g. data decompression) which, by its nature, requires relatively little processing power to accomplish. Thus, the method of this invention exploits the inherent asymmetry in the overall process of an EUS querying a remote Server (and/or Server Network) for a data service (e.g. retrieval of AV data in faster than real time) where most of the processing power and global scheduling is performed by the Server.

16 Claims, 5 Drawing Sheets

FLOW DIAGRAM
INITIATE SESSION

Fig. 4

FLOW DIAGRAM END USER SESSION

Fig. 5

REMOTE QUERY COMMUNICATION SYSTEM

RELATED APPLICATIONS AND CLAIM OF PRIORITY

This application is a continuation in part of co-pending U.S. Ser. No. 07/665,528, entitled Remote Query Communication System filed Mar. 4, 1991 and now abandoned.

FIELD OF THE INVENTION

The present invention is directed to a system, a device and method for remote query data transmission, processing and communication. In particular, the present invention is directed to devices and methods for transmitting, retrieving and storing both compressed and non-compressed data responsive to a query.

BACKGROUND OF THE INVENTION

There has long been a need to provide a system, method and device which can rapidly enter, communicate, distribute and/or retrieve data and display the data in a timely fashion for a variety of applications. Such a system and method could be utilized to immediately access and rapidly display information relevant to new consumer products, financial information, real estate listings, travel accommodations and special events or performances and the like at an end user station as well as provide timely updates of such information. The device could be conveniently located in a home, office or hotel and could be conveniently transported.

It would be desirable to provide a system in which both queries and corresponding responses could be processed at a remote server and then transmitted in either a compressed or non-compressed format back to an end user station (EUS).

It is thus a principal object of the present invention to provide a system which facilitates the timely display of data which may be transmitted by a remote host/server to an EUS in compressed or non-compressed formats.

It is an additional object of the present invention to provide a remote query communication system (hereinafter "RQCS") which can be accessed via a direct dial telephone system, a CATV system or an auxiliary input/output means such as FM radio.

It is also an object of the present invention to provide a system in which data communication and/or query processing is provided in at least plural end user stations plus intermediaries such as a concentrator between the downloading and a display device and at least one server in a distributed system.

It is a further objective of the present invention to provide a remote query communication system incorporating an asymmetric compression/decompression system in which data compressed utilizing a powerful server is decompressed utilizing a less powerful end-user station.

It is yet a further object of the present invention to provide a remote query communication system in which the end user station is mobile.

It is still a further object of the present invention to provide an RQCS which can select from a stream of packeted responses faster than real time electronic data signal packets data and which is responsive to a query selecting any specified query answer in a multi-tasked signal and/or graphic and/or animation providing data environment.

It is still a further object of the present invention to provide on RCQS which can store a downloaded preferably at least in part highly compressed (>20:1) query answer packet further can repeatedly redisplay parts and/or all of packeted data on an end-user command further having a new in part and/or total query answer data replacement/storage data.

It is yet a further object of the present invention to provide an end user system which provides multiple replay.

It is still another object of the present invention to provide for an optional EUS query selection and/or preselected program/presentation downloading capability optionally at preselected scheduled times by an EUS operator subscriber.

It is still a further objective of the present invention to provide a system in which selection and/or presentation is system wide.

These and other objects of the present invention will become apparent from the Summary and Detailed Description which follow.

SUMMARY OF THE INVENTION

The present invention is directed to an improved method and apparatus for displaying audio/visual data and/or graphical/tabular information transmitted from a remote server to an end user station (EUS) for the purpose of decompressing (optional), viewing and/or listening to the responsive data. In operation, the EUS transmits a query to the server for the purpose of initiating a process in the server (e.g. data compression, indexing into a very large database, etc.), via an optional concentrator or requiring the high speed processing, large capacity and multi-distributed data storage, etc. typically included in the server. The EUS provides appropriate inverse processing (e.g. data decompression where appropriate) which, by its nature, requires comparatively fewer computer resources to accomplish. Thus, the method of this invention exploits an inherent asymmetry in the overall process in which an EUS queries a remote server (and/or Server Network) for a data service (e.g. retrieval of audio visual data in faster than real time) where most of the processing power resides in the Server. Data distribution efficiencies for EUS devices can improve by using the intermediary or a concentrator in conjunction with clusters of EUS devices connected via concentrator to a server. FM auxillary service centers can also serve such a function.

In accordance with the present invention, a method for data retrieval from a remote server comprising the following steps and displaying said data is disclosed. The invention comprises the following steps: formulating a query via a data input means and transmitting said query to remote query and data processing means; transmitting said query from said remote query and data processing means to a remote host via input/output means; receiving a compressed or non-compressed response to said query at said remote query and data retrieval system from said remote host via said input/output means; decompressing, said query if compressed; and displaying and optionally providing audio for a presentation corresponding to said query results on a output means.

THE DETAILED DESCRIPTION OF THE PRESENT INVENTION

Figure 1:
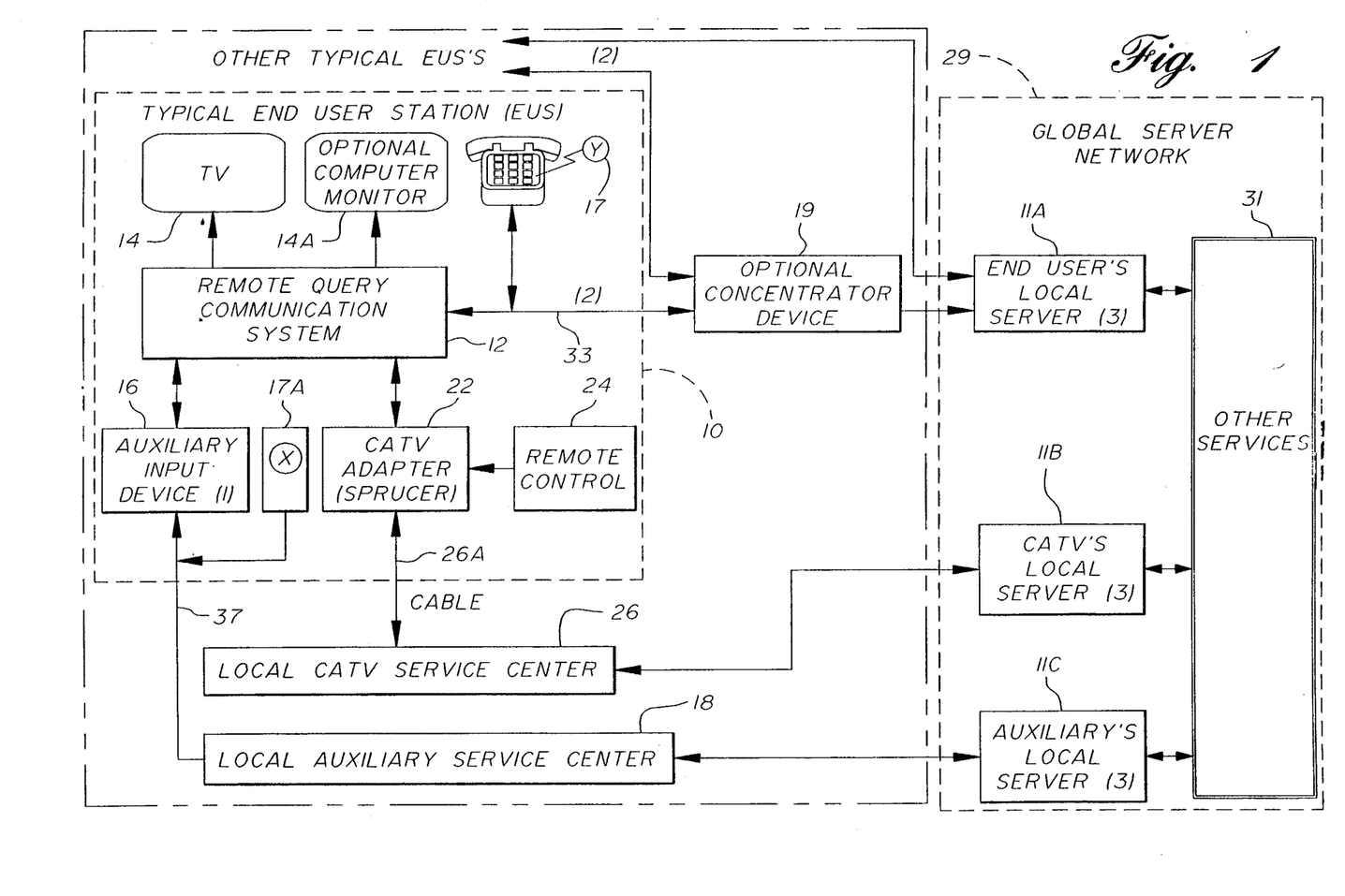
FIG. 1 is an overview of the system of the present invention including the remote query communication system.

The present invention is described with reference to FIGS. 1 through 5, wherein the same numbers are utilized where applicable. Referring to FIG. 1, the overall system of the present invention is detailed. As shown, the invention comprises a typical end user station (EUS) 10 which comprises the remote query communication system 12 of the present invention, a TV monitor 14 or optional computer monitor 14a.

The system is configured for communication by three alternative modes to a more powerful host server 11. Initially, the system can utilize an auxiliary input device 16 which communicates via radio frequency with a local auxiliary service center 18 and on to an auxiliary local server 11a. Secondly, a CATV adapter (sprucer) 22 which may be under remote control 24 may be utilized. This interface is connected via a cable to a local CATV service center 26 and through to the CATV local server 11b. Finally, the end user system is connected via a DDS (direct dial service) 33 only hook-up and to an end user local server 11c. It is to be noted that the end user local server 11c, CATV local server 11b and auxiliary server 11a can be themselves connected to other servers 31 as components of a larger overall global server network 29. Each server within the system may utilize a CISC or RISC based processor, and may operate under UNIX. The host could also be a workstation such as the HP Apollo Series 7000 with PA-RISC architecture. Preferably, these servers 11a-11c may operate in a windowing environment, and should have a system-wide accessible database.

Where a cluster of EUS's 10 cannot economically justify a single dedicated server, a neighboring server in the Global Server Network 29 may be loaded with services for the said cluster of EUS's. In this case, communication between an individual EUS 10 and the Server is accommodated through a concentrator 19 which stores and forwards EUS requests and corresponding server replies, thereby allowing for more efficient utilization of the DDS communication channel. Implementation of the concentrator may utilize standard hardware, for example, an 80×86 based PC (where x is 2 or higher) such as the DELL system 210 equipped with a multiple DDS line peripheral card(s) such as QUATECH ES-100, 8-Serial Port Plug-In and commercially available communications software which supports multiple asynchronous I/O lines, such as Greenleaf COMMLIB 'C' Library of Functions and the TEES MULTI-LINE COMM SOFTWARE.

Thus, for example, a typical EUS 10 within a cluster can use its local DDS 33 to place a request, which is stored in the concentrator 19 and which is automatically forwarded, overnight, along with requests from other EUS's in the cluster, to the neighboring server, with corresponding replies. The reply is received and stored during the same connect session for next day (or later) access by the requesting EUS. The concentrator 19 can be accessed via a separate direct dial telephone 17. In addition, the local auxiliary service center 18 can be accessed by an optional beeper or 2-way voice communication unit 17a.

Figure 2:
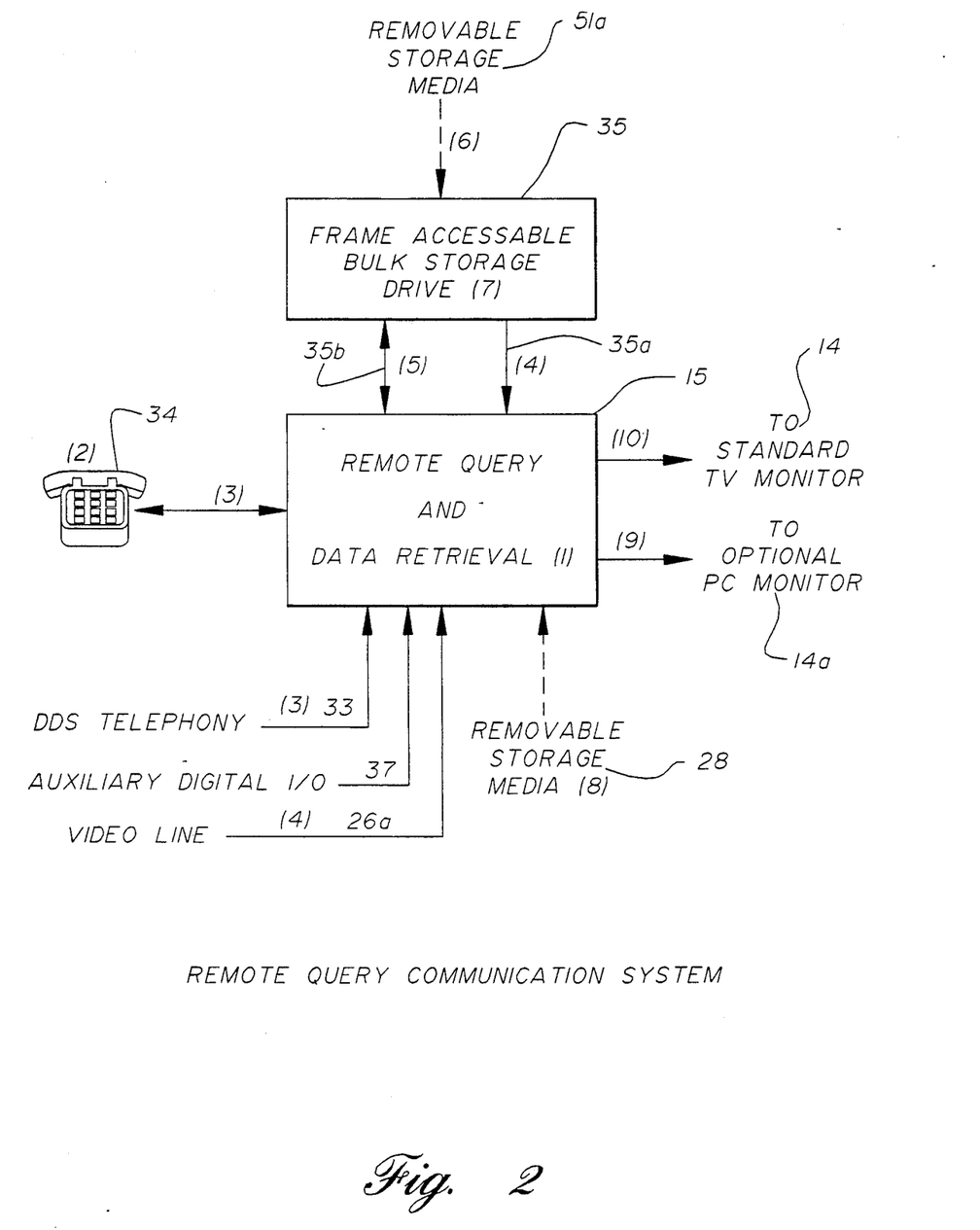
FIG. 2 is a block diagram of the remote query communication system of the present invention.

Referring to FIG. 2, the remote query communication system 12 of the present invention is shown in block diagram form. The system will typically reside at the end user station 10 such as a home, office, hotel/conference center, real estate brokerage office or other location remote from the more powerful server or host processor or computer 11 which is connected via one of the three above discussed alternative connection means. The server 11 will typically include special purpose, high speed processing and large capacity multi-distributed storage capability. The server 11 will typically be more powerful than the EUS 10, can preferably be UNIX based, and should utilize a CISC or RISC based processor which is capable of utilizing compression software such as fractal-transform technology, manufactured and marketed by Iterated Systems, Inc. of Norcross, Ga., and which can be enhanced by coprocessors. In addition, the host processor should be able to operate in a windowing environment. Other compression/decompression packages such as JPEG and DFF (Differential Image Storing) may also be utilized by the host/server 11 of the present invention. The system 12 includes a remote query and data retrieval system as well as touchtone dial phone hookup.

The EUS system 10 includes a remote query and data retrieval system (shown in detail in FIG. 3) 15 which itself includes a means providing optional decompression of remotely compressed non-coded and coded information (i.e. image and tabular data). An example of such a decompression system is the decompression software module developed and marketed by Iterated Systems, Inc. of Norcross, Ga. The operation of this module requires a microprocessor no more powerful than an Intel 286 microprocessor. The system and its implementation is thus inherently asymmetric in that the remote server/host 11 utilizes, and by necessity requires, a more powerful processor for data compression than the EUS 10 requires for data decompression.

The EUS 10 further is used in association with a standard telephone handset 34 with DTMF dialing capability. DTMF is known to those skilled in the act Dual Tone Multiple Frequency. The telephone set 34 is connected to the remote query and data retrieval system 12 via a standard modular interconnection to direct dial service telephony (DDS) 33. This system may be interfaced with a standard MODEM and Universal Synchronous/Asynchronous Transmitter and Receiver (USART). This interface can be used for communication of compressed data to supplement a locally stored bulk or large database (which may contain data relevant to catalogue, travel portfolio, real estate listings, etc.) with timely updates.

As discussed above with respect to FIG. 1, the remote query and data retrieval system 15 is interfaced with remote computer or host 11 via several alternative communications means. Initially, as noted above, the system can connect to the remote host via standard modular interconnection to a direct dial service (DDS) 33. Secondly, the remote query and data retrieval system can be connected to the remote host via an auxiliary digital I/O line 37. An example of such a line is derived from a commercial FM broadcast station and uses one of its two sidebands to transmit digital data (so called "silent radio"). This is a low bandwidth (under 2400 baud) channel of the type used to provide announcements on "Times Square" like displays. Third, as noted above, the EUS 10 can interface the host 11 via a video input line 26a. This type of signal is derived, for example, from the Cable TV (CATV) Adapter's (i.e. Sprucer) 22 identified above. In an operational example, a remote query could be initiated via the adapter remote control 24 which would then be transmitted to the local cable service center 26 which, by prearrangement, will forward it to the server 11. The query, and its associated response, may be preformulated and prestored at the server 11 or even at an EUS requiring only periodic updates via a packeted query answer (i.e. PQA; a Prestored Query Answer). After being cleared via an appropriate security check (e.g. subscriber password), the server 11 may initiate an AV (Audio-Visual) response to the EUS 10. The channel through which the specified AV response is sent to the EUS 10, and as also designated by pre-arrangement, is tuned via the CATV adapter.

The system further can be connected on a video line 26a via a standard composite signal (STCS). As used throughout this specification, the words "standard television composite signal" or its acronym STCS shall be read to mean any one of the following: NTSC, PAL, SECAM, HDTV, or any American or European broadcast signal standards. An NTSC composite signal is defined as the analog signal that carries the chrominance (color), luminance (brightness), synchronization (timing) and audio signals that make up the video signals received and displayed by television and video cassette records. These four components are combined into one signal by modulating the components in different ways. (Amplitude modulation and phase modulation are examples.) The standard video line signal is such a composite signal and may be received at an input line from one of the above-mentioned sources.

Referring to FIG. 2, the remote query and data retrieval system most preferably is also connected to a frame accessible bulk storage drive 35 for the purpose of accommodating a large locally stored database. Examples of such a system include a standard VCR, CD-ROM player or the like having the ability to access individual picture frames under remote control. The remote query and data retrieval system accesses the frame accessible bulk storage drive 35 via a standard television composite signal (STCS) 35a or, in the alternative, a frame advance/backup control 35b. A VCR control system which can be utilized in the present invention was disclosed in an article entitled "A VCR-Based Access System for Large Pictorial Databases", by Eng, Yue, Haskell and Grimes, AT&T Technical Journal, Vol. 64, No. 10, December, 1985, which is incorporated herein by reference. The frame accessible bulk storage drive 35 itself has the capability for high capacity storage of digital (coded or non-coded) or analog encoded baseband information which is accessible on a frame basis (i.e. VCR tape cartridge, CD-ROM disk, or other storage media 51a). The remote query and data retrieval system can output either to a standard TV monitor 14, i.e. RF modulated (i.e. frequency shifted) STCS or a standard RGB output signal to a device such as a PC monitor 14a.

If a PC is optionally used as an element of the EUS 10, then an RGB signal is fed to the PC monitor 14a. The PC preferably should be configured to operate in a windowing environment. The use of a PC monitor 14a in the EUS 10, although not a basic requirement of this invention, represents a means by which the EUS can provide an upgradable flexibility (via special purpose application programs) so as to take advantage of more sophisticated services—for example, those requiring scheduled automatic interaction between the server 11 and EUS 10.

If the broadband signal is RF Modulated (i.e. Frequency Shifted), the system operates in substantially the same manner as an STCS based system except that the base band is frequency shifted in the RF spectrum to match a channel (usually channel 2 or 3) of the standard FCC assigned VHS frequencies. This is necessary in order to appropriately tune the signal for connection to the antenna input to standard television monitor 14a. The remote query and data retrieval system optionally may store (i.e. magnetic tape, floppy diskettes) digital representations of non-coded and coded data 28.

Figure 3:
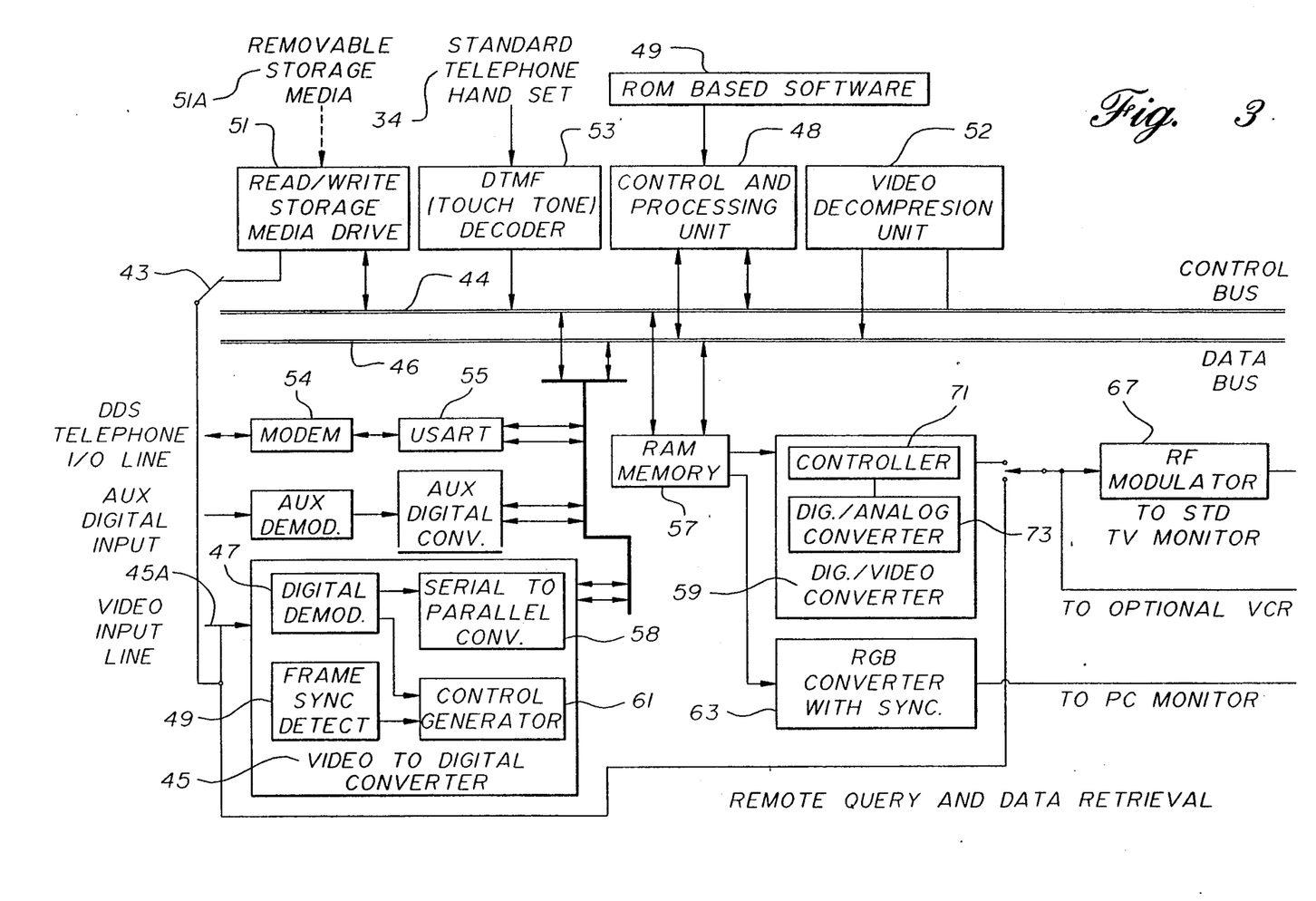
FIG. 3 is a block diagram of the remote query and data retrieval system of the present invention.

Referring to FIG. 3, a block diagram representation of the remote query and data retrieval system is shown in detail. As shown, the system comprises several components which interface via a control bus 44 and a data bus 46. The system will incorporate a control and processing unit 48 which will typically include a microprocessor such as an Intel 8086, 80286, 80386, 80486 or higher power Intel compatible microprocessor. In the alternative, a Motorola 68000 series microprocessor may be used. The microprocessor operates under the control of an operating system such as MS-DOS, PC-DOS, UNIX, XENIX or other operating system. In addition, the system stores ROM based applications software 49. An example of a suitable ROM 49 which may be used in the present invention is the NCR 23C512-15 CMOS ROM chip manufactured by the NCR Corporation. This is a 28 pin ROM. An additional ROM which can be utilized is 28C256EEPROM manufactured by Raytheon Corporation.

The removable storage media interfaces both the control bus 44 via a read/write storage media drive 51 and the video input line via 26a a switch 43. As shown, the standard telephone hand set interfaces the control bus 44 via a DTMF (touchtone decoder) 53. An example of a commercially available DTMF receiver which can be utilized in the present invention is the 276-1303 DTMF receiver by Archer.

Referring to the lower left portion of FIG. 2, DDS telephone line 33, as noted above, is connected to the system via a modem 54 and USART 55. An example of a suitable modem chip for use in the present invention is the Bell 212A single chip 1200/300 BPS modem. This modem is a single chip modulator/demodulator circuit fully compatible with the Bell 212A standard. It contains a 1200 BPS TSK Mod/Demod and a fallback 300 BPSFSK Mod/Demod. This chip further has on-chip scrambler and descrambler synchronous to synchronous and synchronous to asynchronous conversion circuitry. In addition, the present invention can utilize the Intel 8251 USART. This circuit has five internal registers and can operate in either a synchronous or asynchronous mode and is capable of higher rates. The auxiliary digital input/output line connects via auxiliary digital input/output port 42.

The video input line connects via a video input port 44 and a video-to-digital converter 45. This element includes a digital demodulator 47, frame synchronizer 49 such as the Motorola MC1378 and a serial to parallel converter 58 such as the HC/HCT164 8 bit Serial-in/Parallel Out Shift Register. The demodulator 47 and frame synchronizer 49 feed into a control generator 61.

All of the above systems interface both the data bus 46 and control bus 44.

The system further includes a RAM 57 which is also connected to the data bus 46 and control bus 44. For this purpose either a DRAM (Dynamic RAM) or a SRAM (static) may be employed. An example of a suitable DRAM is the TI (Texas Instruments) TMX4C1024; an example of a suitable SRAM is the INMOS IMS-1203. RAM 57 should have sufficient capacity to store at least two full uncompressed frames (e.g., about 472 KB).

RAM 57 connects to a digital to video converter 59, or, alternatively, a RGB converter 63. The RGB converter 63 interfaces with an output device such as a PC monitor 14a and the digital to video converter 59 and RF modulator 67 connect to the standard TV monitor 14a as shown and described in FIG. 1. The digital to video converter 59 includes a controller 71 and a D/A converter 73 such as the Honeywell HDAC34020. An example of a suitable RF modulator which may be used in the present invention is the Motorola MC1374 RF oscillator/modulator and FM sound oscillator/modulator.

Finally, referring to the upper right hand portion of FIG. 2, the Remote Query and Data Retrieval system further incorporates a decompression module 52. A FRACTAL decompression (software-hardware) module such as developed by Barnsley and Sloan at the Georgia Institute of Technology and currently marketed by Iterated Systems of Norcross, Ga., may be utilized for decompression. CCITT, JPEG and other optional decompression techniques may also be utilized in the present invention.

Furthermore, in order to accommodate efficient compression and decompression of animated sequences (as in feature film video), a technique of Differential (DFF) Image Compression (DIC), as described in an article by John Bridges in Dr. Dobb's Journal #173 February 1991, page 38, et seq may utilized as part of the decompression module.

In particular, within the input video data stream comprised of sequences of header and data frames, as described more fully, a screen of data which is self contained and not relevant to or dependent upon any prior frames in the sequence. An example would be the first frame in the sequence, or any frame in which the scene has changed. In this case the video portion of the RAM 57 is completely updated. This contrasts with a DFF frame (i.e. one with only differential data dependent upon the immediately preceding frame) where only those pixels in the image which have changed are updated in the video portion of the RAM 57.

The method of DIC, for example, bitmap or skip/copy, as described in the Dr. Dobb's Journal reference, is determined at compression time where the selection is based on the optimum compression efficiency and is encoded in the Frame Identification (FID) interval. This allows for the receiver (i.e. EUS) to dynamically adapt to the method of compression in the current frame. Moreover, more than one in the sequence of differential frames are packed into a standard STCS frame format, forming a cluster of DFF frames. The number of DFF frames in the cluster, which depends, in part, on the rate of image change, is also encoded in the FID at compression time. On a sufficiently high bandwidth channel (e.g. CATV as incorporated herein) this may produce a "faster than real time" data stream of DFF clusters.

In an advantageous special embodiment of the invention where DDF frames make up 90 percent or more of a typical animated sequence (for example, reasonable quality video for film feature, high quality video for computer generated graphics), it is a part of the method of this invention that such a data stream be time division multiplexed into one containing a multiplicity (i.e. more than one) of independent animated sequences. This results in the effective increase in capacity of a single CATV channel to concurrently provide more than one feature film to independent subscribers (i.e. different EUS's).

It is also a part of the method of this invention that improved (maximum) compression be obtained by combining the DIC methodology for DFF frames, just described, with a high compression ratio methodology for reference frames such as the FRACTAL technique described herein. As an alternative, a combination of compression technologies may be used to communicate a reasonable quality video single animated sequence over a lower bandwidth channel such as the standard DDS phone lines, in real time, where the data rate is effectively 1600 bytes per second or above.

On decompression of the DIC data at the EUS, the decompression unit 52, under control of the video to digital converter 59 via the control bus 44, as directed by control information in the FID, which includes the method of DFF decompression, (for example, Bit Map or Skip/Copy), will decompress either a reference frame or a DFF frame. For a reference frame, all of the image's pixels in the video portion of the RAM 57 are updated. For a DFF frame, only those pixels which have changed since the last frame are updated in RAM 57. Also, when dealing with a cluster of DFF frames, the cluster of frames is first stored in RAM 57, and then released to the digital to analog converter 73 in real time for display via the Controller, which is, itself, directed by the control bus 44.

It is considered a part of the method of this invention that the combination of control information contained in the input data stream, as described herein, and the architecture of the EUS, including control 44 and data bus 46 interconnecting the various hardware and software elements, implements the EUS's capability to dynamically adapt in real time to changing requirements, for example, method of data compression, configuration of EUS, etc.

The operation of the invention is now described with reference to the Figures. In summary, the present invention permits an end user (i.e. an authorized subscriber of the System) to access multiple distributed databases which may include a variety of data forms (e.g. AV, Graphical/Tabular, movies, etc.), compressed or not, and to display this data (decompressed if compressed) on a standard television set, including audio, if present. The databases typically reside at the remote server and will be accessible via the EUS 10.

The EUS 10 may reside in a home or office and may be accessible to one or more host/servers 11. The host/servers may house services characterized by one or more databases pertinent to consumer products, real estate, financial data, etc. Typically, the end user, after connecting to a particular remove server via a standard telephone handset or CATV sprucer 22, will use the appropriate keypad to enter authorization codes and queries for a particular service. After receiving confirmation from the host/server 11, he/she may follow up with additional commands (e.g. order codes, product ID, menu selections, etc.) which are also entered through the touch tone keypad. When the touch tone keypad is utilized, the touch tone signals (otherwise known by those skilled in the art as Dual Tone Multiple Frequency) are decoded using the DTMF receiver and are passed to the control and processing unit 48 for processing via the control bus 44. Alternatively, if the keypad of the remote control 24 is used as the user input device, the signal is processed by the local CATV service center 26 by prearrangement. The query is then transmitted to the host/server 11 via one of the above-noted transmission techniques (i.e. DDS, Video Line or Auxiliary Digital I/O).

If the EUS includes CATV as a form of End User-Server interaction, then connection and command entry to the Remote Server may be accomplished via its Adapter (i.e. Sprucer). In this case, the Cable Service, by pre-arrangement will pass along the authorization codes and PQA's and use a dedicated channel to provide the video input (i.e. AV, Graphical/Tabular data, etc.) to the EUS via its video input port in standard STCS. This is preceded by a header frame which qualifies the remainder of the transmitted data packet. The header, for example, includes EUS addressing -only the requesting EUS which is selected to receive the data packet. The header also plays back to the EUS its initiating commands (e.g. PQA) and other control information so that, for example, the EUS can properly manage the incoming data (e.g. decompress, if necessary). It is to be noted that the remote server itself may be linked as part of a larger network of host/servers. Hence, data can be linked and transferred among a multiplicity of host/server regions.

Using the example of a mail order catalog, the end user station could be located in a family residence. The catalog could be pre-stored on a VCR tape presentation and playable on a frame accessible bulk storage drive. Using the touch tone keypad or the handset, the end user could access a remote host computer via a DDS telephone line. Using the push button phone, the user would type in his or her user access number and input a query relevant to the VCR catalog presentation. The query would be transmitted via the modem and USART and processed by the remote host computer 11. The remote host 11 would then transmit back to the EUS 10 responsive data. This data would be stored in RAM 47 and could be called up and displayed on the TV monitor 14.

Figure 4:
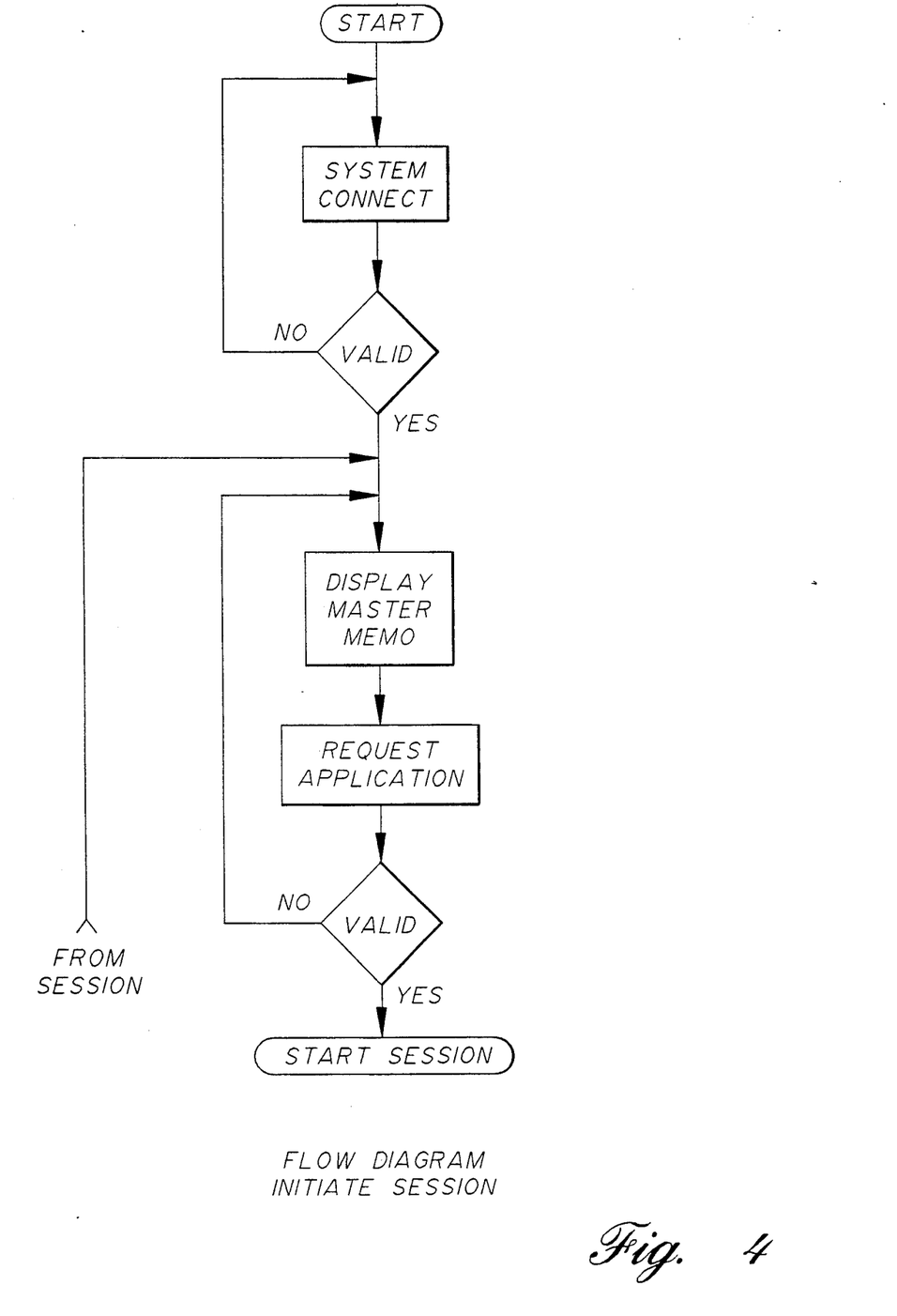
FIG. 4 is an algorithmic flow diagram utilized to initiate a query session.
Figure 5:
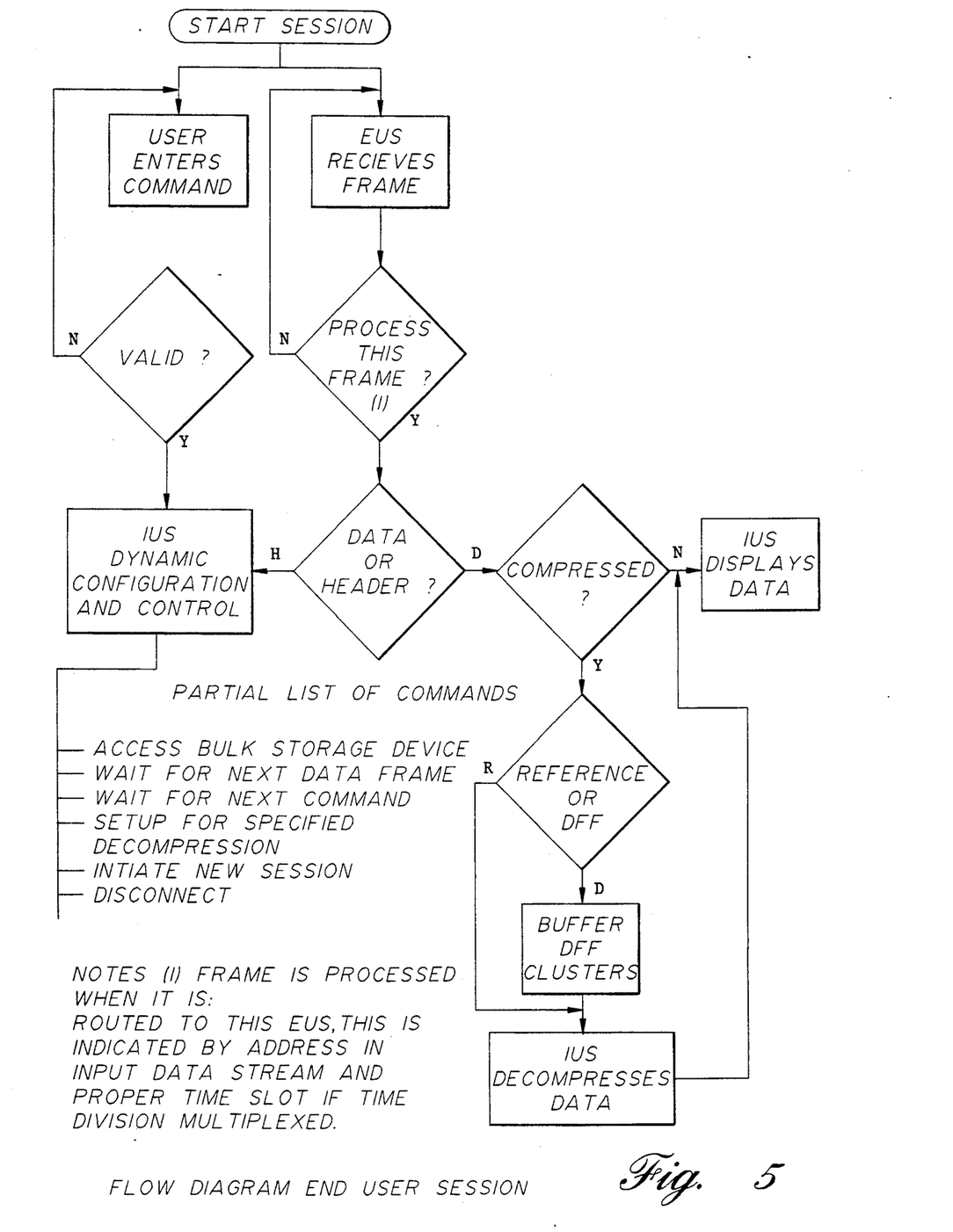
FIG. 5 is an algorithmic flow diagram illustrating the sequence of a model session from the end user's standpoint.

FIG. 4 illustrates a flow diagram for initiating a search. Initially, the system is connected. If a valid user ID is inputted, a master menu is displayed. An application is then requested. If valid, a session is started. Referring to FIG. 5, after a session is started, the end user enters a command. Examples of the types of commands which may be entered are commands to access the bulk storage drive; commands to wait for the next data frame; commands to wait for the next command; commands authorizing the set-up for specified decompression; commands to initiate a new session; and commands to disconnect. The command enters the EUS dynamic configuration and control module.

If the frame is processed, it is routed to the EUS. The determination is then made if the frame is data or header. If header, it is routed to the EUS dynamic configuration and control system. If data, determination is made whether the data is compressed. If non-compressed, the EUS displays the data. If the data is compressed, a determination is made whether the data is referenced or DFF. If referenced, the EUS decompresses the data and displays. If DFF, the system buffers the DFF cloisters, decompresses the data and then displays the data. DTMF touch tone signals are decoded using a commercially available integrated circuit (e.g. Archer part number 276-1303) and passed to the control and processing unit 48 for processing via the control bus 44.

If the EUS 10 includes CATV as a means of end user interaction, then connection to and command entry to the Remote Server may be accomplished via its Adapter (i.e. Sprucer) 22. In this case, the Cable Service, by pre-arrangement will pass along the authorization codes and PQA's and use a dedicated channel to provide the video input (i.e. AV, Graphical/Tabular data, etc.) to the EUS via the video input port in standard STCS preceded by a header frame which qualifies the remainder of the transmitted data packet. The header, for example, includes EUS addressing -only the requesting EUS is selected to receive the data packet. The header also plays back to the EUS the commands (e.g. PQA) and other control information so that the EUS can properly manage the incoming data (e.g. decompress, if necessary).

The form of the video input from the CATV is characterized as a succession of STCS like frames, each of which includes information that is processed by the Remote Query Communication Systems (RQCS) as indicated in the Flow Diagram-End User Session.

Frames are classified as either Header or Data. Header frames always contain digital encoded information which is used principally for dynamic configuration and control of the RQCS; Data frames may contain either digital or analog encoded information and are processed by the RQCS for output to the End User (i.e. display, audio, storage for later playback).

Standard frame synchronization is enhanced by encoding a Frame Identification Code (FID) within the vertical blanking interval associated with the frame (as described in the Eng article). The FID is used principally to identify Header and Data frames.

Several standard methods may be utilized to modulate the digital portion of a frame which are known to those skilled in the art; for example, Frequency Shift Keying (FSK), Modified Frequency Modulation (MFM), Phase Shift Keying (PSK). MFM, the preferred method, is a form of base band modulation typically used to encode data on magnetic disk media, with a long standing track record of reliable usage. MFM is adapted to the method of this invention, indicated as the Digital Demodulator in the block diagram of the Remote Query and Data Retrieval.

While the present invention has been described with reference to the above detailed description, the true nature and scope of the present invention should be determined with reference to the claims appended hereto.

We claim:

1. A method for downloading responsive data from a remote server comprising the following steps:

identifying a query via a data input means and inputting said query to remote query and data retrieval means;

transmitting said query from said remote query and data retrieval means to a remote host via an input/output means;

receiving a compressed or non-compressed response to said query at said remote query and data retrieval system from said remote host via said input/output means; and displaying a presentation corresponding to said query response on output means.

2. Apparatus for querying and downloading data from a remote server comprising:
   means for creating a query via a data input means and inputting said query to remote query and data retrieval means;
   means for transmitting said query from said remote query and data retrieval means to a remote host via an input/output means,
   said remote query and data retrieval system receiving a response to said query from said remote host via said input/output means, said remote query and data retrieval displaying a presentation corresponding to said query response on output means.

3. Apparatus for querying and downloading data from a remote server in a system comprising:
   means for formulating a query via a data input means and inputting said query to remote query and data retrieval means;
   means for transmitting said query from said remote query and data retrieval means to a remote host via an input/output means,
   said remote query and data retrieval system receiving a compressed response to said query from said remote host via said input/output means, said remote query and data retrieval system decompressing said compressed response to said query; and
   displaying a presentation corresponding to said query response on display means.

4. The apparatus is of claim 3 wherein said transmission means is a CATV communication system.

5. The apparatus is of claim 3 wherein said transmission means is a direct dial telephone system.

6. The apparatus is of claim 3 wherein said transmission means is an auxiliary communication system.

7. Apparatus for querying and downloading data from a remote server comprising:
   end user means for formulating a query via a data input means and inputting said query to remote query and data retrieval means;
   means for transmitting said query from said remote query and data retrieval means to a remote host processor via a concentrator means,
   said remote query and data retrieval system receiving a compressed response to said query from said remote host via said input/output means, said remote query and data retrieval system decompressing said compressed response to said query, and displaying a presentation corresponding to said query response on output means.

8. The apparatus of claim 7 further comprising concentrator means for storing and forwarding EUS requests and corresponding server responses for a multiplicity of EUS's.

9. The apparatus of claim 7 wherein said remote host utilizes a RISC based processor and a UNIX based operating system.

10. The apparatus of claim 7 wherein said remote host utilizes a CISC based processor and a UNIX based operating system.

11. The apparatus of claim 7 wherein said Compressed response is compressed utilizing at least two compression techniques.

12. The apparatus of claim 9 wherein said RISC based processor and said UNIX based operating system operate in a windowing environment.

13. The apparatus of claim 9 wherein said CISC based processor and said UNIX based operating system operate in a windowing environment.

14. The apparatus of claim 7 wherein said remote server resides on a compatible network in which CISC and RISC based processors operating with a UNIX based operating system communicate in a windowing environment.

15. The apparatus of claim 7 wherein said end user station incorporates an embedded microprocessor, wherein said microprocessor comprises an Intel 80×86, where X is an integer greater than 1.

16. The apparatus of claim 7 wherein said end user station incorporates an embedded microprocessor, wherein said microprocessor comprises an Motorola 68OYO, where Y is an integer greater then 2.

* * * * *

(12) EX PARTE REEXAMINATION CERTIFICATE (5820th)
United States Patent
Rozmanith et al.

(10) Number: US 5,253,341 C1
(45) Certificate Issued: Jul. 24, 2007

(54) REMOTE QUERY COMMUNICATION SYSTEM

(75) Inventors: Anthony I. Rozmanith, Cherry Hill, NJ (US); Neil Berinson, Cherry Hill, NJ (US)

(73) Assignee: TECHSEARCH, L.L.C., Northbrook, IL (US)

Reexamination Request:
No. 90/005,742, Jun. 9, 2000

Reexamination Certificate for:
Patent No.: 5,253,341
Issued: Oct. 12, 1993
Appl. No.: 07/683,972
Filed: Apr. 11, 1991

Related U.S. Application Data (63) Continuation-in-part of application No. 07/665,528, filed on Mar. 4, 1991, now abandoned.

(51) Int. Cl.
G06F 15/16 (2006.01)
G06K 9/36 (2006.01)
H04N 7/173

(52) U.S. Cl. .................................. 709/247; 382/233
(58) Field of Classification Search ................ 709/247, 709/231, 203, 217; 25/115, 120, 118, 123, 25/122, 110, 133, 87, 104; 382/233; 375/240.01–240.25
See application file for complete search history.

(56) References Cited

U.S. PATENT DOCUMENTS

| | | | |
|---|---|---|---|
| 3,656,178 A | * | 4/1972 | Maine et al. ................ 341/87 |
| 4,209,784 A | | 6/1980 | Sumner et al. |
| 4,274,139 A | | 6/1981 | Hodgkinson et al. |
| 4,281,315 A | | 7/1981 | Bauer et al. |
| 4,386,416 A | * | 5/1983 | Giltner et al. ................ 380/10 |
| 4,430,530 A | * | 2/1984 | Kandell et al. ................ 379/6 |
| 4,506,387 A | | 3/1985 | Walter |
| 4,538,174 A | * | 8/1985 | Gargini et al. ................ 348/7 |
| 4,569,016 A | * | 2/1986 | Hao et al. ..................... 395/23 |

(Continued)

OTHER PUBLICATIONS

Leung et al. "A Software Architecture for Workstations Supporting Multimedia Conferencing in Packet Switching Network".*

(Continued)

*Primary Examiner*—Larry D. Donaghue (57) ABSTRACT

An improved method and apparatus for downloading compressed audio/visual (AV) data and/or graphical/tabular information from a remote Server to an End User Station (EUS) for the purpose of decompressing and/or displaying said downloaded data. The EUS may transmit a query to the Server manually and/or automatically for the purpose of initiating a process in the Server (e.g. data compression, indexing into a very large database, etc.), which requires the high speed processing, large capacity and multi-distributed data storage, etc.) which are typically preferred at a Server. The EUS provides appropriate inverse processing (e.g. data decompression) which, by its nature, requires relatively little processing power to accomplish. Thus, the method of this invention exploits the inherent asymmetry in the overall process of an EUS querying a remote Server (and/or Server Network) for a data service (e.g. retrieval of AV data in faster than real time) where most of the processing power and global scheduling is performed by the Server.

U.S. PATENT DOCUMENTS

| | | | | |
|---|---|---|---|---|
| 4,581,484 A | * | 4/1986 | Bendig | 179/2 |
| 4,604,686 A | | 8/1986 | Reiter et al. | |
| 4,623,147 A | | 11/1986 | Ackerman et al. | |
| 4,648,036 A | | 3/1987 | Gallant | |
| 4,648,037 A | | 3/1987 | Valentino | |
| 4,665,519 A | * | 5/1987 | Kirchner et al. | 370/349 |
| 4,679,079 A | * | 7/1987 | Catros et al. | 348/412 |
| 4,723,211 A | | 2/1988 | Barker et al. | |
| 4,724,521 A | | 2/1988 | Carron et al. | |
| 4,726,017 A | * | 2/1988 | Krum et al. | 370/85 |
| 4,739,477 A | | 4/1988 | Barker et al. | |
| 4,745,428 A | | 5/1988 | Miyasaka | |
| 4,751,635 A | | 6/1988 | Kret | |
| 4,754,428 A | | 6/1988 | Schultz et al. | |
| 4,760,390 A | | 7/1988 | Maine et al. | |
| 4,764,867 A | | 8/1988 | Hess | |
| 4,769,762 A | | 9/1988 | Tsujido | |
| 4,777,485 A | | 10/1988 | Costello | |
| 4,779,080 A | | 10/1988 | Coughlin et al. | |
| 4,797,742 A | * | 1/1989 | Sugiyama et al. | 348/407 |
| 4,821,211 A | | 4/1989 | Torres | |
| 4,823,338 A | | 4/1989 | Chan et al. | |
| 4,829,372 A | * | 5/1989 | McCalley et al. | 348/7 |
| 4,845,658 A | | 7/1989 | Gifford | |
| 4,918,588 A | | 4/1990 | Barrett et al. | |
| 4,924,303 A | | 5/1990 | Brandin et al. | |
| 4,949,187 A | * | 8/1990 | Cohen | 386/69 |
| 4,949,248 A | | 8/1990 | Caro | |
| 4,951,139 A | * | 8/1990 | Hamilton et al. | 348/404 |
| 4,955,066 A | * | 9/1990 | Notenboom | 382/240 |
| 5,014,125 A | * | 5/1991 | Pocock et al. | 348/7 |
| 5,021,997 A | | 6/1991 | Archie et al. | |
| 5,027,400 A | * | 6/1991 | Baji et al. | 380/20 |
| 5,049,993 A | * | 9/1991 | LeGall et al. | 348/448 |
| 5,065,447 A | | 11/1991 | Barnsley et al. | |
| 5,115,392 A | | 5/1992 | Takamoto et al. | |
| 5,124,980 A | | 6/1992 | Maki | |
| 5,132,992 A | | 7/1992 | Yurt et al. | |
| 5,161,214 A | | 11/1992 | Addink et al. | |
| 5,163,131 A | * | 11/1992 | Row et al. | 709/202 |
| 5,179,652 A | | 1/1993 | Rozmanith et al. | |
| 5,210,825 A | | 5/1993 | Kavaler | |
| 5,276,866 A | * | 1/1994 | Paolini | 709/219 |
| 5,347,632 A | | 9/1994 | Filepp et al. | |

OTHER PUBLICATIONS

Richards, A UNIX–MVS, Based Mod Storage System for Super Commuter p. 108–113, 1988.*
"Unix Past", 2002.*
"Computer History, History of Unix/Linex and other variants", 2002.*
Johnston et al. "Distributed Scientific Video Movie Making" pp. 156–162, 1988.*
LeGalli "The MPEG Video Compression Standard" pp. 334–335, 1991.*
See et al. Efficient Encoding of DC Coefficients in Transform Coding of Images Using JPEG Scheme pp. 404–407, Jun. 1991.*
Auld, "A Flexible Chip Set Intra Frame Compressor" 330–332 pg., Mar. 1991.*
Vocabulary for Data Processing, Telecommunication and Office Systems p. 106, 1981.*
Crawford "The i486 CPU: Executing in One Cloea Cycle" pp. 27–36, 1990.*
Koopman; "Design Tradeoffs in Stoeh Computer A Personal Experience" pp. 5–9, Mar. 1990.*
Patterson et al. *Computer Architecture A Quantitative Approach* p. 127, 1990.*
Lindinsky, Data Communication Needs pp. 28–33, Mar. 1990.*
Carr et al. New Video coding Standard for the 1990, pp. 119–124 Jun. 1990.*
Chip Set Introduces PC Builders to Multiprocessing World, Apr. 1990.*
Wind River Vxworks (TM) Realtime Operating System Bundled with Concurrent Computer 6000 Seires, Jan. 1990.*
Steam to rise 1990s Workstation Arena as Vendors Vie for Supremacy, Oct. 1989.*
IBM's RS/60000 announcement, Feb. 1990.*
AT&T Intros server for wide–ranging networks, Apr. 1990.*
UNIX Server target Commerial Uses, Mar. 1989.*
DEC pushes Price vs Performance , Aug. 1989.*
Intel enters Network File Servers, May 1989.*
Prime Offers Unix MPs from Sequent, Aug. 1989.*
MIPS announces two file severs, Unix V 4.0 agreement, Oct. 1989.*
IBM UNIX thrust carries promise, Risk, Feb. 1990.*
Altos expected to Debut Workstation that operates under both DOS and UNIX, Jul. 1988.*
Banyan, Oracle team up on server option, Apr. 1989.*
Oracle version 6.0 covers the Distributed Data 'bases', Jun. 1989.*
Motorola plans low–end Unix network server, Apr. 1989.*
A Parallel Future, Nov. 1989.*
Unix frees Debvelopers from RISC–specific work, Apr. 1990.*
The New Agenda for open Systems, Apr. 1990.*
AIM Technology offers OS–2 and Unix Benchmarks, Jul. 1988.*
IPT brings uShare server to SCO Unix and Xenix, Apr. 1990.*
AT&T introduces Rhapsody for Business Orchestration, Mar. 1990.*
Motorola Revs into Server Mart, Mar. 1990.*
AT and T Broadens data Systems' net options; Company offers X–windows support, bolstres Connectivity of 3b minis and terminal subnets, Nov. 1989.*
Multiple terminals can do Super Work, firm says, Jul. 1989.*
DEC Product Rollout includes Ultrix Servers, Jul. 1989.*
MIPS shows ECL RISC Superserver, Nov. 1989.*
Pyramid's Network Server Offers 12CPUs, up to 150 Mips; an early RISC convert hopes to Conquer the Unix Market, Feb. 1989.*
Hewlett adds HP–UX 7.0 , two Unix RISCs, X400 for UNIX . . . , Aug. 1989.*
Sun Intros sub–$10,000 RISC Computer, Apr. 1989.*
DG unveils new Unix Version to Support Aviion Family, Mar. 1989.*
Electronics Engineers' Handbook pp. 23–88, 1989.*
Bridges, Differential Image Compression, Feb. 1991.*
Punj, Broadband Applications and services of Public Switched Networks, 1989.*
Mahon et al. Hewlett–Packard Precision Architecture; The Processor pp. 4–22, 1996.*
Bramnsley et al. A Better Way to Compress Images pp. 215–223, 1998.*
Sugimoto, Michio et al., 'Videotex: Advancing to Higher Bandwidth', *IEEE Communications Magazine* of Feb. 1988–Vol. 26, No. 2, pp. 22–30.

Udanax.com, 'FeBe Introduction' and other information obtained from the World Wide Web http://www.udanax.com/green/febe.

Theodor HolmNelson Project Xanadu, and Keio University, 'Xanalogical Structure, Needed Now More Than Ever: Parallel Documents, Deep Links to Content, Deep Versioning and Deep Re–Use', pp. 1–33.

Ngan et al, "Picture Transmission for Videotex," IEEE Transactions on Consumer Electronics, vol. CE–31, No. 1, Aug. 1985.*

"Picture transmission for Videotex", by Ngan et al., published by IEEE transactions on Consumer Electronics, vol. CE–31, No. 3, Aug. 1985.

"Analysis of End–to–End Performance of Multimedia Information Services on A Local Area Network", by Shibata et al., published by Proceedings of the 13th IEEE Conference on Local Computer Networks.

"Efficient Coding for Integrated Information Systems and Multimedia Databases", by Bassiouni et al., published by Proceedings of the 13th IEEE Annual International Computer Software and Application Conference.

"Advanced Videotex Terminal", by Tanaka et al., published by Proceedings of the IEEE 1988 International Conference on Consumer Electronics.

Universal Data Compression Scheme for Enhancing Multi–Media Communications, by Ken–lehi Aihara, published by Proceedings of IEEE International Conference on Communications 1986.

"Image Integration In Office Information Systems: An Operating Model", by Williams et al., published by Proceedings of the 1986 IEEE International Conference on Systems, Man, and Cybernetics.

"Distributed Seedis: An Information System Using Local Area and Long Distance Networks", by Gey et al., published by Proceedings of the 4th IEEE International Conference on Distributed Computing Systems.

Design and Implementation of a Relational Database Server In a Heterogeneous Network Environment, by Le Viet et al., published by Proceedings of the IEEE International Conference on Data Engineering.

Query Transformation In Heterogeneous Distributed Database Systems, by Rusinkiewicz et al., published by Proceedings of the IEEE 5th International Conference on Distributed Computing Systems.

"A Picture and Text Query and Archiving System", by Pau, published by Elsevier Science Publishers, 1986.

"A Relational Database System With Remote–Access Capabilities", by Ruschitzka et al., published by Proceeding of AFIPS 1984 National Computer Conference.

"Remote Access MicroMeSH: A Microcomputer System for Searching the MEDLINE Database", by Lowe et al., published by the IEEE 12th Annual Symposium On Computer Applications In Medical Care.

"For Quick Queries, Little–Known BCP May Help Users", by Magnuski et al., published by Data Communications in May, 1986.

"Multi–Thread Host Server For PC Support", published by IBM Technical Disclosure Bulletin, vol. 28, No. 9, Feb. 1986.

"Voice and Data On a CATV Network", by Maxemchuk et al., published by IEEE Journal on Selected Areas In Communications, vol. SAC–3, No. 2, Mar. 1985.

Selected Pages from the Aug. 1991 Edition of the Dialog Information System User's Manual.

"RFC 959, File Transfer Protocol (FTP)," specification, published Oct. 1985.

Screen shots dated 1997 from "Database Tool Quick Reference Guide", Copyright 1988–1900; Prodigy Services Company.

"PC Flowers", by McCabe, published by *Online Access*, Winter, 1992.

"Information Management: A Proposal", by Tim–Berners–Lee, published Mar. 1989.

"Dialoglink and Trademarkscan–Federal: Pioneers in Online Images", by N. J. Thompson, published in Online Magazine, May 1, 1989.

"Dialog Comments on Imaging Capabilities", by Chadwick, published in Online Magazine, May 1, 1989.

"Image Catcher Nabs Dialog Graphics", by Welch, published in MacWeek, Feb. 20, 1990.

A paper which describes an image format, entitled "Graphics Interchange Format (GIF)", published by CompuServe on Jun. 15, 1987.

An evaluation of Compuserve's autopilot software package for the Mac, entitled "Navigator: CompuServe's Autopilot for the Mac, PC–Computing", by Robinson, which was published on Nov. 1, 1998.

An article related to "Navigator" and the transfer of graphic images using GIF format, entitled "Data Communications", which was published Feb. 1, 1988, McGraw Hill, Inc.

Using CompuServe's Graphics Formats; RLE, Run Length Encoded and GIF, by Balas, which was published Sep. 1988.

Telecommunications Has Taste for Beefier Mac, by Dejean, which was published on Feb. 2, 1988.

"Videotex Enters Another Dimension", by Temime, which was published on Sep. 25, 1989.

"Feature Tips From Europe's ISDN Pioneers", by Mantleman, which was published in Data Communications, May 1, 1989.

"Image Basics: A Guide to Capturing Images from Dialog's Image Databases", by Dialog Information Services, Inc., which was published in 1988.

Chapter 4 (pp. 92–119) of Handbook of Computer–Communications Standards, vol. 3, by Stalling et al., published by McMillan Publishing Company in 1988.

Pages 1,3,5,7,9,11 and 270 and 272 of Data Networks by D. Bertsekas et al., published by Prentice Hall in 1987.

"Prodigy: Smart Sales Channel", published in Inc. Magazine, Feb. 1997.

"A VCR–Based Access System For Large Pictorial Databases" by Eng et al., published by AT&T Technical Journal, vol. 64, No. 10 (Dec. 1985).

"http://www.w3org/history.html", which has an article entitled A Little History Of The World Wide Web.

"http://members.aol.com/qscreens".

"http://ww2.ari.net/home/jpurkey".

"http://www.personal.umich.edu/~craighch/sidplayer/history/hist pr.htm".

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–16 are cancelled.

New claim 17 is added and determined to be patentable.

*17. A method for downloading responsive data from a remote server comprising the following steps:*

*(a) identifying a query via a data input means and inputting said query to remote query and data retrieval means;*

*(b) transmitting said query from said remote query and data retrieval means to said remote server via an input/output means;*

*(c) receiving a compressed or non-compressed response to said query at said remote query and data retrieval means from said remote server via said input/output means;*

*(d) displaying a presentation corresponding to said compressed or non-compressed response on output means;*

*(e) wherein said compressed or non-compressed response is compressed prior to receipt at said remote query and data retrieval means, and wherein said compressed response is decompressed at said remote query and data retrieval means using an asymmetric decompression technique corresponding to an inverse operation of the technique used to compress said compressed or non-compressed response.*

\* \* \* \* \*

(12) EX PARTE REEXAMINATION CERTIFICATE (7194th)
United States Patent
Rozmanith et al.

(10) Number: US 5,253,341 C2
(45) Certificate Issued: Nov. 24, 2009

(54) REMOTE QUERY COMMUNICATION SYSTEM

(75) Inventors: Anthony I. Rozmanith, Cherry Hill, NJ (US); Neil Berinson, Cherry Hill, NJ (US)

(73) Assignee: Global Patent Holdings, LLC, Northbrook, IL (US)

Reexamination Request:
No. 90/008,972, Dec. 21, 2007
No. 90/009,381, Jan. 12, 2009

Reexamination Certificate for:
Patent No.: 5,253,341
Issued: Oct. 12, 1993
Appl. No.: 07/683,972
Filed: Apr. 11, 1991

Reexamination Certificate C1 5,253,341 issued Jul. 24, 2007

Related U.S. Application Data

(63) Continuation-in-part of application No. 07/665,528, filed on Mar. 4, 1991, now abandoned.

(51) Int. Cl.
*G06F 17/30* (2006.01)

(52) U.S. Cl. .......................... 709/247; 706/934; 707/10; 707/E17.005; 707/E17.01; 709/219; 725/105

(58) Field of Classification Search .................. 709/247; 706/934; 707/10, E17.005, E17.01; 798/219; 725/105
See application file for complete search history.

(56) References Cited

U.S. PATENT DOCUMENTS

| | | | | |
|---|---|---|---|---|
| 4,464,650 A | * | 8/1984 | Eastman et al. | ................ 341/51 |
| 4,506,387 A | | 3/1985 | Walter | |
| 4,941,193 A | * | 7/1990 | Barnsley et al. | ............. 382/249 |
| 4,987,480 A | | 1/1991 | Lippman | |
| 5,014,125 A | | 5/1991 | Pocock | |
| 5,065,447 A | * | 11/1991 | Barnsley et al. | ............. 382/249 |
| 5,113,496 A | | 5/1992 | McCalley | |
| 5,347,600 A | * | 9/1994 | Barnsley et al. | ............. 382/249 |
| 5,347,632 A | | 9/1994 | Filepp | |
| 5,420,981 A | | 5/1995 | Ivie | |
| 7,028,182 B1 | * | 4/2006 | Killcommons | ............... 713/161 |

OTHER PUBLICATIONS

Timothy C. Bell, Ian H. Witten & John G. Cleary, *Modeling for Text Compression*, ACM Computing Surveys, vol. 21, Issue 4, pp. 557–591 (Dec. 1989).

Timothy c. Bell, *Better OPM/L Text Compression*, IEEE Transactions on Communications, vol. 34, Issue 12, pp. 1176–1182 (Dec. 1986).

Steve Rosenthal, *JPEG Emerging as Standard for Compressing Image Files*, MacWeek Magazine, vol. 4, Issue 12, p. 31 (Mar. 27, 1990).

Terry A. Welch, A Technique for High–Performance Data Compression, IEEE Computer, vol. 17, No. 6, pp. 8–19 (Jun. 1984).

(Continued)

*Primary Examiner*—Majid A. Banankhah (57) ABSTRACT

An improved method and apparatus for downloading compressed audio/visual (AV) data and/or graphical/tabular information from a remote Server to an End User Station (EUS) for the purpose of decompressing and/or displaying said downloaded data. The EUS may transmit a query to the Server manually and/or automatically for the purpose of initiating a process in the Server (e.g. data compression, indexing into a very large database, etc.), which requires the high speed processing, large capacity and multi-distributed data storage, etc.) which are typically preferred at a Server. The EUS provides appropriate inverse processing (e.g. data decompression) which, by its nature, requires relatively little processing power to accomplish. Thus, the method of this invention exploits the inherent asymmetry in the overall process of an EUS querying a remote Server (and/or Server Network) for a data service (e.g. retrieval of AV data in faster than real time) where most of the processing power and global scheduling is performed by the Server.

OTHER PUBLICATIONS

H.C. Kotze and G. Kuhn, An Evaluation of the Lempel–Ziv–Welch Data Compression Algorithm, Southern African Conference on Communications and Signal Processing, IEEE COMSIG 1989 Proceedings, pp. 65–69 (Jun. 23, 1989).

Timothy C. Bell, Better OPM/L Text Compression, IEEE Transactions on Communications, vol. 34, Issue 12, pp. 1176–1182 (Dec. 1986).

Andrew Lippman and William Butera, Coding Image Sequences for Interactive Retrieval, Communications of the ACM, vol. 32, Issue 7, pp. 852–860 (Jul. 1989).

Steve Rosenthal, JPEG Emerging as Standard for Compressing Image Files, MacWeek Magazine, vol. 4, No. 12 (Mar. 27, 1990).

Stephen Manes, The Road to Respect; Digital Video Interactive, PC Computing, vol. 2, No. 3, pp. 107–115 (Mar. 1989).

Michael Tinker, DVI Parallel Image Compression, Communications of the ACM, vol. 32, Issue 7, pp. 844–851 (Jul. 1989).

Charles Bowen and David Peyton, Getting the Most Out of CompuServe, Chapters 1 and 19 (4th ed. 1989).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–16 were previously cancelled.
Claim 17 is cancelled.

* * * * *